United States Patent
Lin

(10) Patent No.: US 11,484,752 B2
(45) Date of Patent: Nov. 1, 2022

(54) JUMP COUNTING METHOD FOR JUMP ROPE

(71) Applicant: Zhejiang University, Hangzhou (CN)

(72) Inventor: Feng Lin, Hangzhou (CN)

( * ) Notice: Subject to any disclaimer, the term of this patent is extended or adjusted under 35 U.S.C. 154(b) by 322 days.

(21) Appl. No.: 16/843,914

(22) Filed: Apr. 9, 2020

(65) Prior Publication Data

US 2020/0306585 A1    Oct. 1, 2020

Related U.S. Application Data

(63) Continuation of application No. PCT/CN2019/100305, filed on Aug. 13, 2019.

(30) Foreign Application Priority Data

Mar. 26, 2019 (CN) .......................... 201910233226.9
May 24, 2019 (CN) .......................... 201910439917.4

(51) Int. Cl.
*G06T 7/00* (2017.01)
*G06T 7/187* (2017.01)
(Continued)

(52) U.S. Cl.
CPC ............ *A63B 24/0003* (2013.01); *A63B 5/20* (2013.01); *A63B 24/0062* (2013.01); *G06T 5/001* (2013.01); *G06T 7/0016* (2013.01); *G06T 7/11* (2017.01); *G06T 7/13* (2017.01); *G06T 7/174* (2017.01); *G06T 7/187* (2017.01); *G06T 7/248* (2017.01); *G06T 7/90* (2017.01); *G06V 40/23* (2022.01); *G10L 25/78* (2013.01); *A63B 2220/05* (2013.01); *A63B 2220/17* (2013.01);
(Continued)

(58) Field of Classification Search
CPC ... A63B 24/0003; A63B 5/20; A63B 24/0062; G06T 7/187; G06T 7/11; G06T 7/13; G06T 7/174; G06T 7/90; G06T 7/248; G06T 5/001; G06T 7/0016; G06T 2207/10016; G06T 2207/20024; G06T 2207/20076; G06T 2207/30201; G06V 40/23
See application file for complete search history.

(56) References Cited

U.S. PATENT DOCUMENTS

| | | | | |
|---|---|---|---|---|
| 2012/0251079 A1* | 10/2012 | Meschter | ................. | G09B 5/02 386/278 |
| 2016/0163036 A1* | 6/2016 | Kim | ....................... | G06V 40/23 382/107 |

(Continued)

FOREIGN PATENT DOCUMENTS

| CN | 201061687 Y | 5/2008 |
|---|---|---|
| CN | 108653974 A | 10/2018 |

(Continued)

OTHER PUBLICATIONS

ISR of International Application PCT/CN2019/100305.

*Primary Examiner* — Kenny A Cese

(57) ABSTRACT

A jump counting method for jump rope is provided. The jump counting method comprises: S1, obtaining an original video data of a jump rope movement, and extracting an audio data and an image data from the original video data; S2, calculating the number of jumps of the rope jumper according to an audio information and an image information extracted from the audio data and the image data; and S3, outputting and displaying the calculation result.

13 Claims, 7 Drawing Sheets

(51) Int. Cl.
  *G06T 7/11*     (2017.01)
  *G06T 7/13*     (2017.01)
  *G06T 7/174*    (2017.01)
  *G06T 7/90*     (2017.01)
  *G06T 7/246*    (2017.01)
  *G06V 40/20*    (2022.01)
  *G06T 5/00*     (2006.01)
  *A63B 24/00*    (2006.01)
  *A63B 5/20*     (2006.01)
  *G10L 25/78*    (2013.01)

(52) U.S. Cl.
  CPC .............. *A63B 2220/806* (2013.01); *G06T 2207/10016* (2013.01); *G06T 2207/20024* (2013.01); *G06T 2207/20076* (2013.01); *G06T 2207/30201* (2013.01); *G10L 2025/783* (2013.01)

(56) References Cited

U.S. PATENT DOCUMENTS

2018/0116561 A1\* 5/2018 Jo .................... G08B 13/1436
2020/0282261 A1\* 9/2020 Patil .................. G06F 3/011

FOREIGN PATENT DOCUMENTS

| | | |
|---|---|---|
| CN | 206730467 U | 12/2018 |
| CN | 109939432 A | 6/2019 |
| JP | 01265382 A | 10/1989 |
| KR | 20070036393 A | 4/2007 |
| TW | 655022 B | 4/2019 |

\* cited by examiner

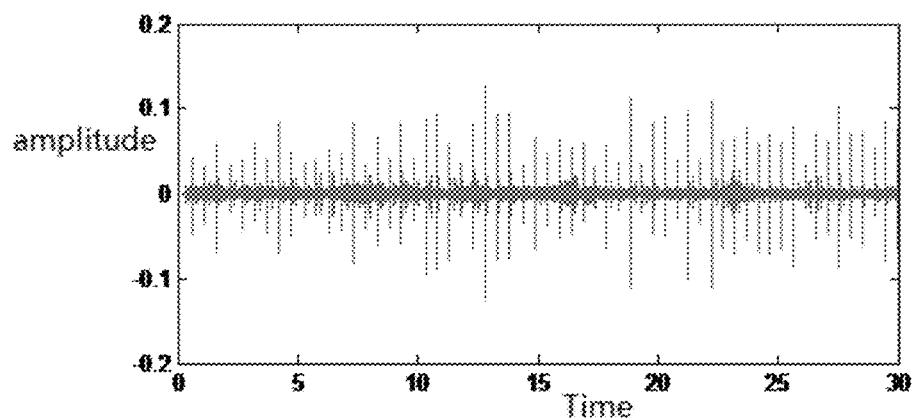
Fig. 3
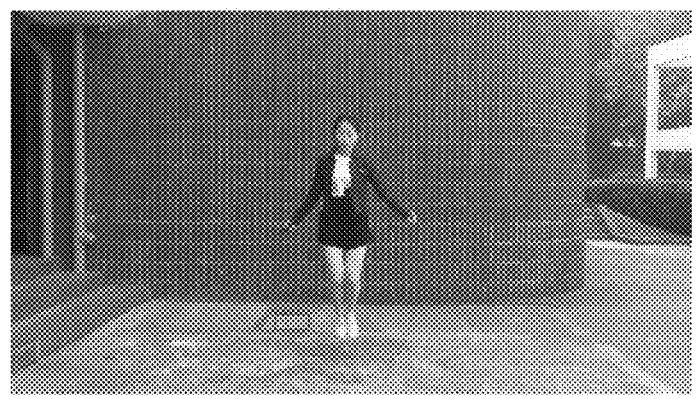
Fig. 4
  
Fig. 5A      Fig. 5B      Fig. 5C

JUMP COUNTING METHOD FOR JUMP ROPE

CROSS-REFERENCE TO RELATED APPLICATIONS

This application is a continuation of and claims priority to International (PCT) Patent Application No. PCT/CN2019/100305, filed on Aug. 13, 2019, entitled "JUM COUNTING METHOD FOR JUMP ROPE", which claims foreign priority of Chinese Patent Application No. 201910439917.4, filed on May 24, 2019, and 201910233226.9, filed on Mar. 26, 2019, in the China National Intellectual Property Administration (CNIPA), the entire contents of which are hereby incorporated by reference in their entireties.

TECHNICAL FIELD

The present disclosure relates to the filed of fitness equipment, and in particular to a jump counting method for jump rope.

BACKGROUND

Jump rope is one of the popular sports around the world. Rope jumpers need to count the number of rope jumps in order to know their exercise amount. However, in the present, rope jumpers have to count by themselves or the referees. When rope jumpers count their own jumps, it will distract the rope jumper and cause mistakes. The referees' counting is not reliable sometimes.

In the prior art, there is an electronic counter installed in the handle for counting jumps. For example, a jump rope disclosed by Chinese patent publication NO. CN107715368A includes a rope body and handles provided at both ends of the rope body; wherein the rope body is a transparent hose. There is a lighting device arranged in the hose; each of the handles is provided with a cavity, and a counter and a controller are provided in the cavity. The counter is configured to detect the number of jumps and send the number to the controller. The controller determines obtains the jump rope speed on basis of the jump rope period and the jumps, and controls the lighting mode of the lighting device according to the jump rope speed. This device can detect the jump rope speed of the user, increase exercise efficiency, and improve fun in exercise. However, the counter placed in the handle cannot identify whether the jump is a normal one (i.e. the rope jumper jumps over the rope normally). There is miscounting and will cause incorrect results.

With the development of technology, there are more and more kinds of motion algorithms on the wristband or watch. The motion algorithm, which originated in the early 21st century, uses sensors to obtain real-time data on the wristband or watch, then processes and calculates the data, and then displays the processed data on the wristband or watch, so that the wearer can clearly obtain the movement information, such as the user's movement track and steps.

Chinese patent publication No. CN108744471A discloses a jump counting method for jump rope based on a wristband, which obtains user's jump data according to sensors installed on the wristband; the jump data is processed in cycles in the X-axis and Y-axis directions, respectively. The current cycle on the X axis with the previous cycle on the X axis are compared, and the current cycle on the Y axis with the previous cycle on the Y axis are compared. The jumps can be obtained by the result of the comparison on the X axis or the comparison on the Y axis. However, this method has a problem of inaccurate counting.

SUMMARY OF THIS INVENTION

An object of the present disclosure is to provide a jump counting method for jump rope. The jump counting method is capable of automatically and correctly counting jumps by the fusion of video and audio information during jump rope.

Another object of the present disclosure is to provide a jump counting method for jump rope. The jump counting method analyzes the visual and auditory sensory mechanism of rope jumper during jump rope, and automatically and correctly counting jumps by the fusion of video and audio information during jump rope.

Another object of the present disclosure is to provide a jump counting method for jump rope based on intelligent target recognition. The number of jumps is calculated by combining the height change of the jumper's face during jump rope and the sound information of jump rope, thereby achieving the auto and exact jump calculation for jump rope.

In a first aspect, the present disclosure provides a jump counting method for jump rope, which includes the following steps:

obtaining an original video data of a jump rope movement, and extracting an audio data and an image data from the original video data;

calculating the number of jumps of the rope jumper according to an audio information and an image information extracted from the audio data and the image data;

outputting and displaying the calculation result.

In some embodiments, the step of "calculating the number of jumps of the rope jumper according to an audio information and an image information extracted from the audio data and the image data" includes:

extracting an audio sampling frequency from the audio data, drawing an audio waveform diagram with time as the abscissa, and determining a period $T_1$ of each jump according to the audio waveform diagram;

performing a single-frame processing on the image data to obtain a set of sequentially arranged single-frame images;

determining a reference area of the single-frame frame images, and grasping the reference area to obtain a reference image;

performing a binary processing and an edge tracking on the reference image, separating a target, and determining whether the target is the jump rope;

determining whether a time interval between adjacent reference images in which the target is determined as the jump rope is less than $T_1$; if yes, keeping the calculation unchanged; otherwise add one to the calculation.

In another embodiments, the step of "calculating the number of jumps of the rope jumper according to an audio information and an image information extracted from the audio data and the image data" includes:

performing a single-frame processing on the image data to obtain a set of sequentially arranged single-frame images;

determining a face region of the jumper in each frame of the image, and extracting height coordinates of center points of the face region;

obtaining a curve of the height coordinates of the center points over time, and using a zero-crossing counting method to obtain the number of jumps of the jumper;

extracting the audio sampling frequency, drawing an audio waveform diagram with time as the abscissa, and using a cross-correlation counting method to calculate the number of jumps;

fusing the video information and the audio information to determine whether the counted number of jumps is valid; if yes, adding one to the calculation; otherwise, keep the calculation unchanged.

In the above embodiments, a high-definition video recording device (such as a smart phone, etc.) can be used at a fixed position from a certain angle and a suitable distance to record the entire jump rope process including the rope jumper. Using visual and auditory sensory mechanisms analysis to process the video and audio information separately, and performing judgement by the fusion of the obtained video and audio information to achieve automatic counting of jumps, which not only saves manual time, improves counting accuracy, but also able to retrack the jump rope by video.

The jump counting method for jump rope according to the present disclosure can automatically and accurately count the number of jumps without manual labor, and can not only perform instant counting, but also perform video playback. Especially with the widespread use of mobile video recording equipment, the method of the present disclosure will have more and more applications.

BRIEF DESCRIPTION OF THE DRAWINGS

FIG. 3 is an audio waveform diagram according to the second embodiment of the present disclosure.

FIG. 4 is a picture of selected reference region according to the second embodiment of the present disclosure.

FIGS. 5A-5C are schematic diagrams of different reference images after binary processing according to the second embodiment of the present disclosure.

DETAILED DESCRIPTION OF THE DISCLOSURE

In order to specify the objectives, technical solutions, and advantages of the present disclosure, the present disclosure is further described as follows with reference to the embodiments and the accompanying drawings.

Embodiment 1

Figure 1:
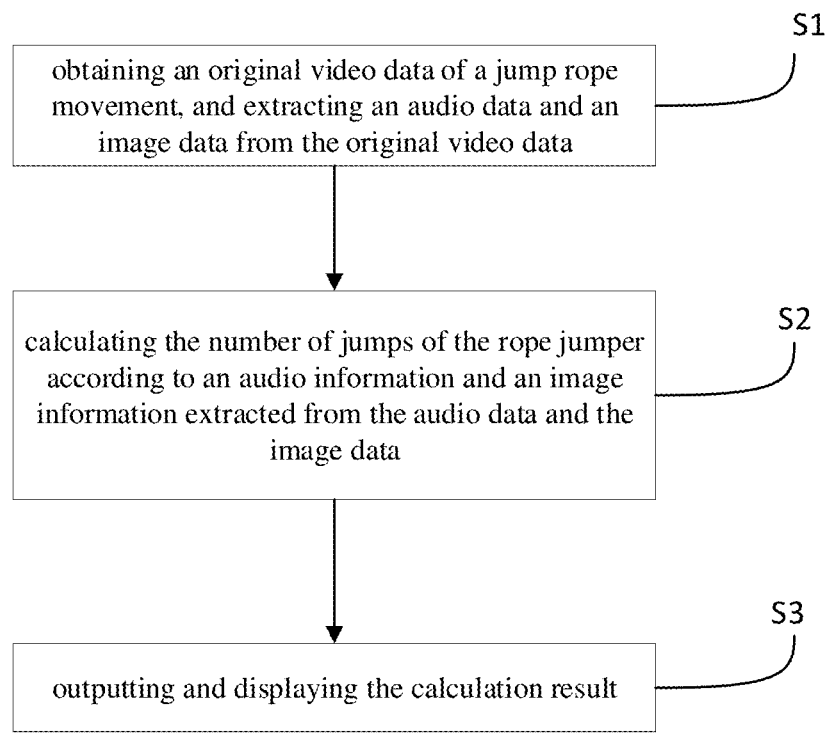
FIG. 1 is a flow diagram of a jump counting method for jump rope according to one embodiment of the present disclosure.

The Embodiment 1 of the present disclosure is to provide jump counting method for jump rope. Referring to FIG. 1, the counting method comprises the following steps:

S1, obtaining an original video data of a jump rope movement, and extracting an audio data and an image data from the original video data;

S2, calculating the number of jumps of the rope jumper according to an audio information and an image information extracted from the audio data and the image data;

S3, outputting and displaying the calculation result.

It is conceivable that the audio information may include audio sampling frequency, audio waveform diagrams with the sampling frequency and time as the coordinates, audio period and other audio information; the image information may include single-frame images obtained after single-frame processing, and reference images grasped after determining the reference region in images, target information after binarization and edge tracking, etc.

In the above embodiment, a high-definition video recording device (e.g. a smart phone, etc.) can be used at a fixed position from a certain angle and a suitable distance to record the entire process including the rope jumper. The jump counting method analyzes the visual and auditory sensory mechanism of rope jumper during jump rope, and automatically and correctly counting jumps by the fusion of video and audio information during jump rope, which not only saves manual time, improves counting accuracy, but also able to retrack the jump rope by video.

Figure 2:
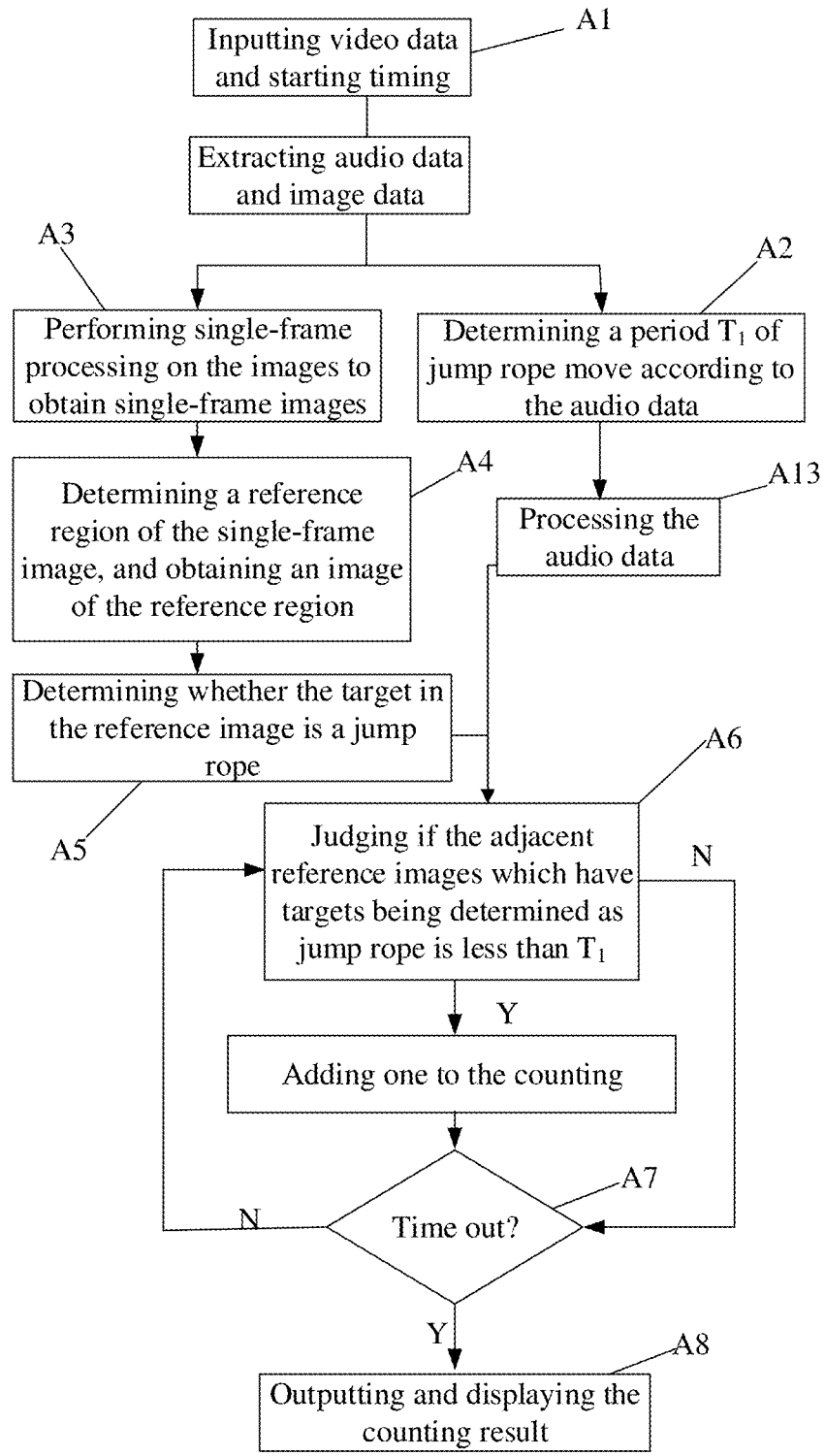
FIG. 2 is a flow diagram of a jump counting method for jump rope according to second embodiment of the present disclosure.

Based on Embodiment 1, referring to FIG. 2, the step S2 may comprise:

A2, extracting an audio sampling frequency from the audio data, drawing an audio waveform diagram with time as the abscissa, and determining a period T1 of each jump according to the audio waveform diagram;

A3, performing a single-frame processing on the image data to obtain a set of sequentially arranged single-frame images;

A4, determining a reference area of the single-frame images, and grasping the reference area to obtain a reference image;

A5, performing a binary processing and an edge tracking on the reference image, separating a target, and determining whether the target is the jump rope;

A6, determining whether a time interval between adjacent reference images in which the target is determined as the jump rope is less than $T_1$; if yes, keeping the calculation unchanged; otherwise add one to the calculation.

Namely, in some preferred embodiments of Embodiment 1, the counting method may comprises the following steps.

A1, obtaining a video data of a jump rope movement, and extracting an audio data and an image data from the original video data.

A2, extracting an audio sampling frequency from the audio data, drawing an audio waveform diagram with time as the abscissa, as shown in FIG. 3; determining a period $T_1$ of each jump according to the period of each sharp sound in the audio waveform diagram; in this embodiment, the average value of all periods is taken.

A3, performing a single-frame processing on the image data to obtain a set of sequentially arranged single-frame images.

A4, determining a reference area of the single-frame frame images, and grasping the reference area to obtain a reference image. The reference area is an area that appears in each jump. When the camera angle or rope jumper is changed, the reference area may change). When the camera is fixed and the position of the jump rope is determined, the reference area can be determined. There are many methods to determine the reference area. In this embodiment, the selection of reference area is as show in FIG. 4. Referring to FIG. 3, a rectangular portion with a length of 77 pixels and a width of 15 pixels, having a coordinate (379, 433) being defined as the upper left vertex, is selected as the reference area. The background color of the rectangular portion is relatively obvious than other portions in the picture, and the noise is small. In each period of the jump, the movement of rope will appear in the rectangular portion.

A5, performing a binary processing and an edge tracking on the reference image, separating a target, and determining whether the target is the jump rope.

The reference image after the binarization process is shown in FIG. 5. In this embodiment, the maximum inter-class variance method is adopted, which is an adaptive threshold determination method, also known as OTSU method. According to the gray characteristics of the image, the image is divided into two parts including the background and the target. The larger the inter-class variance between the backgrounds and the targets, the greater the difference between the two parts. When some of the targets are classified to be the background, or some of the background are classified to be the target, the difference between the two parts becomes smaller. Therefore, the segmentation that maximizes the variance between inter-class variance is the way to minimize the misclassification. After the binarization process, there is still a bit of noise. In the embodiment, objects with an area less than 8 pixels in the binary image will be eliminated for subsequent analysis and processing.

After edge tracking, each target in the image is separated. After separation, these separated targets are labeled respectively, and each separated target is filled with a different color using the HSV method to achieve a more obvious distinguishing effect.

The method to determine what is a jump rope is as follows.

The edge-tracked target is separated out for labeling and coloring by HSV method. Each target will be filled with different color. The three parameters including eccentricity, area, and extreme points of the eight-direction area for each target is obtained and compared with the expected interval. When the three parameters fall within the expected interval, the target is determined as a jump rope.

In this embodiment, the target is determined by judging whether the characteristics of the parabola is conformed to. The rope can be approximately projected to be a parabola during the periodic movement, and the eccentricity of the parabola is 1. Accordingly, if the eccentricity is approximately 1, then it can be determined to be conform to the characteristics of the parabola, and therefore the rope can be identified. In order to be more accurate, the area and the extreme point of the eight-direction area can be used for assisting to identifying the rope.

In this embodiment, the expected interval of the eccentricity is ranged from 0.91 to 1, the expected interval of the area is ranged from 1190 pixels to 1280 pixels, and the data matrix of the extreme point of the eight-direction area is as the following table:

TABLE 1

| | stats.Extrema | |
|---|---|---|
| | 1 | 2 |
| 1 | 0.5000 | 0.5000 |
| 2 | 78.5000 | 0.5000 |
| 3 | 78.5000 | 0.5000 |
| 4 | 78.5000 | 16.5000 |
| 5 | 78.5000 | 16.5000 |
| 6 | 0.5000 | 16.5000 |
| 7 | 0.5000 | 16.5000 |
| 8 | 0.5000 | 0.5000 |

During counting the jumps, a jump will be determined as valid and add one to the counts only when the three parameters falls within the respective expected interval and the table as shown above.

A6, determining whether a time interval between adjacent reference images in which the target is determined as the jump rope is less than T1; if yes, keeping the calculation unchanged; otherwise add one to the calculation.

A7, determining whether the counting time is over.

A8, outputting and displaying the counting result when the counting time is determined over.

Figure 6:
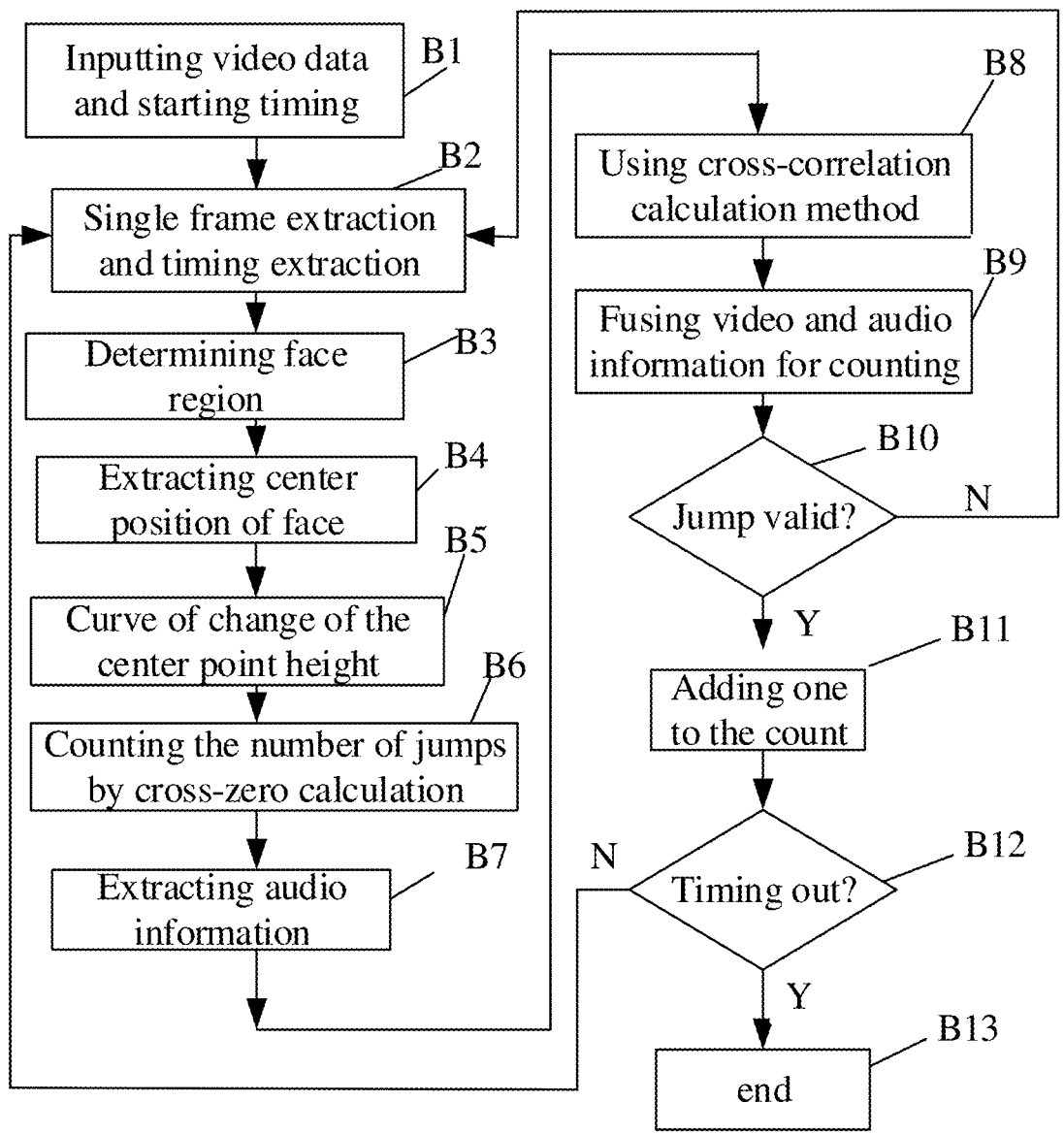
FIG. 6 is a flow diagram of a jump counting method for jump rope according to third embodiment of the present disclosure.

In another embodiments of the embodiment 1, referring to FIG. 6, the step of S2 may further comprises:

S21, performing a single-frame processing on the image data to obtain a set of sequentially arranged single-frame images;

S22, determining a face region of the rope jumper in each frame of the image, and extracting a height coordinate of the central point of the face region;

S23, obtaining a curve of the height coordinate of the central point with time, and using the zero-crossing counting method to obtain the number of jumps of the rope jumper;

S24, extracting a sampling frequency of the audio, drawing an audio waveform diagram with time as the abscissa, and using the cross-correlation method to calculate the number of the rope jumper;

S25, determining whether the jump is valid or not by combining the video information and the audio information; if yes, add one to the calculation.

Namely, in other embodiments of the embodiment 1, as shown in FIG. 6, the counting method may further comprise the following steps.

B1, obtaining the original video data of the jump rope move via the camera, and starting timing.

B2, extracting image data from the original video data, performing single-frame processing on the image data to obtain a set of sequentially arranged single-frame images, and extract the count time.

Figure 7A:
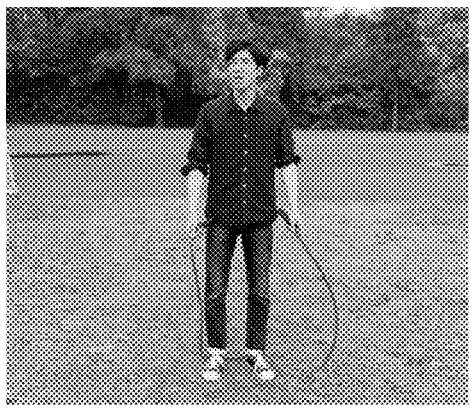
FIG. 7A is a reference image according to the third embodiment of the present disclosure.
Figure 7B:
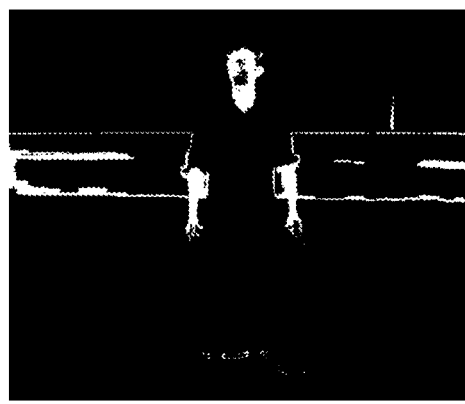
FIG. 7B is a binary image after filtration according to the third embodiment of the present disclosure.
Figure 8A:
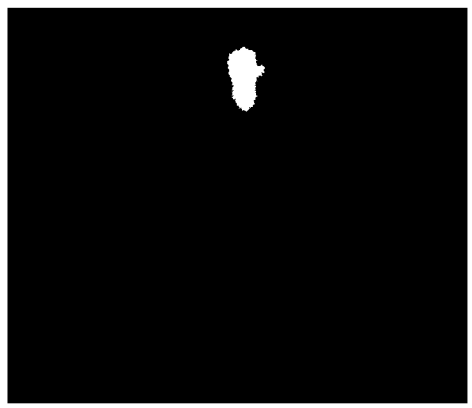
FIG. 8A is a binary image of the reference image removing the non-face skin region according to the third embodiment of the present disclosure.
Figure 8B:
FIG. 8B is an image showing the face region in original RGB image according to the third embodiment of the present disclosure.

B3, determining the face region of rope jumper in each frame of the image. First, skin color recognition is performed on each frame of the image, and the interference data is filtered to obtain a binary image, as shown in FIG. 7. Then non-face skin color regions are excluded. At last, the face regions are framed in the original RGB image for backup, as shown in FIG. 8.

B4, taking out the height coordinates of the center points of the face region.

Figure 9:
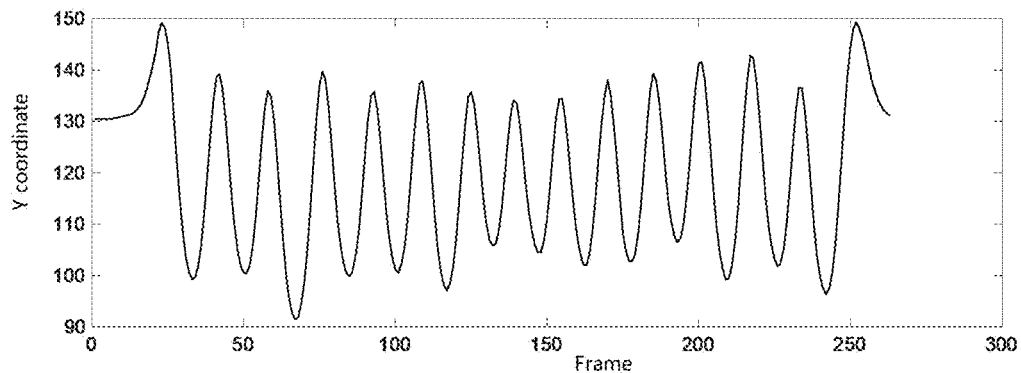
FIG. 9 is a curve diagram of the height coordinate of the central point over time after move the average filtration when N=5.

B5, obtaining the curve of the height coordinates of the center points with time B6, using the zero-crossing counting method to get the number of jumps of the rope jumper. In this embodiment, a curve of the height coordinates of the center points with time is drawn, and the moving average filtering process is performed to obtain the curve as shown in FIG. 9, and then the number of jumps of the rope jumper is obtained by using a zero-crossing counting method. It should be noted that the number of jumper's jumps does not equal the number of jumps of the jump rope in special cases such as continuous jumps.

Figure 10:
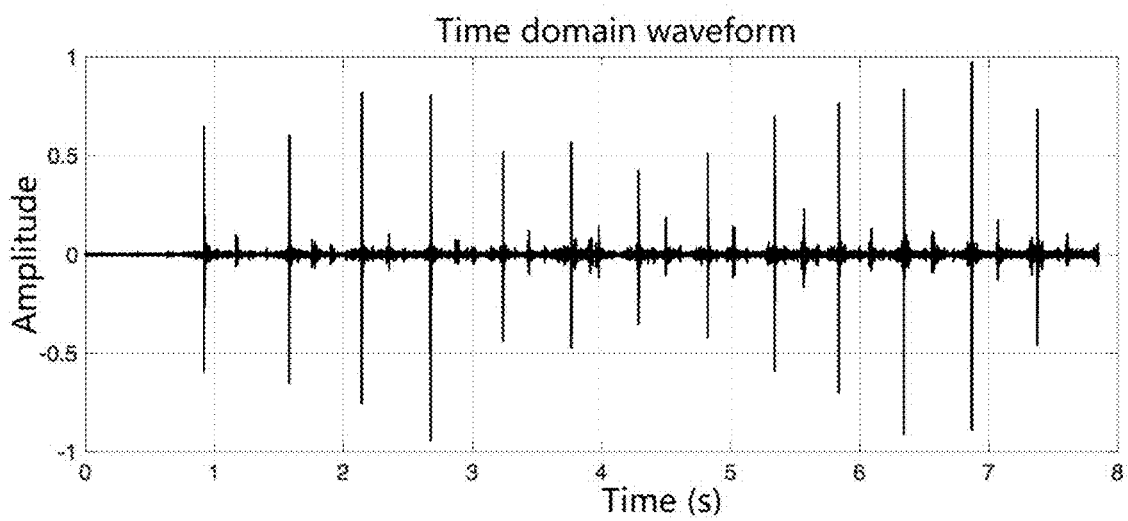
FIG. 10 is an audio waveform diagram with time as the abscissa according to the third embodiment of the present disclosure.

B7, extracting audio data from the video data, and extracting the audio sampling frequency, and drawing an audio waveform diagram with time as the horizontal axis. The resulting time domain waveforms is shown in FIG. 10.

Figure 11:
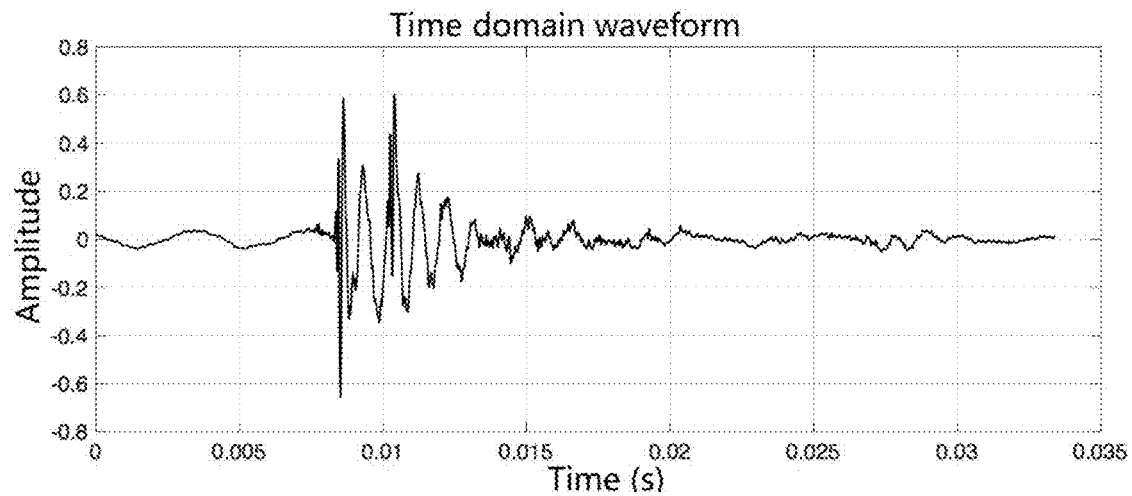
FIG. 11 is time domain waveform diagram of the sample audio according to the third embodiment of the present disclosure.
Figure 12:
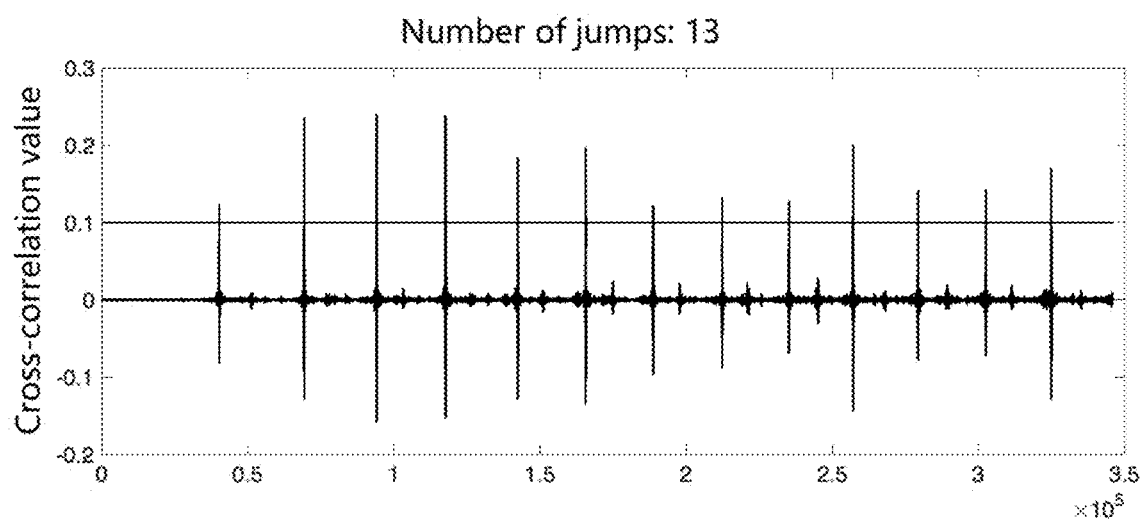
FIG. 12 is a correlation diagram of sample audio and measured audio according to the third embodiment of the present disclosure.

B8, calculating the number of jumps using the cross-correlation method. First, taking the audio segment of a single contact between the jump rope and the ground as the sample audio x, whose time domain waveform is shown in FIG. 11, and taking the sequence of the audio frequency as the measured audio y. The cross-correlation value between the sample audio x and the measured audio y is calculated. Then drawing a diagram of "cross-correlation value", as shown in FIG. 12. A proper cross-correlation threshold is set (i.e. 0.1 in this embodiment), and the number m of times that exceeds the set threshold is counted. Namely, m is the number of jumps.

B9, combining video and audio to determine the number of jump ropes. When there is continuous jumps (i.e. twice or more swings of the rope with single jump).

B10, fusing video and audio information to determine whether the jump is valid.

First of all, invalid jumps shall be excluded. The average jump period $T_1$ is calculated first. When there is a jump with a period greater than $3T_1$, the jump is considered invalid, and will not be counted.

In another situation, finding out the audio jumps within a period of a valid video jumps. When one valid video jump is corresponding to one audio jump, or one valid video jump is corresponding to multiple audio jumps, then the jump is considered as valid and the number of the audio jumps is counted. When there is not audio jumps within the period of a valid video jump, then the jump is considered invalid and will not be counted.

B11, if the jumps is considered valid, then add one to the calculation (counting); if not, no counting.

B12, determining if the set time is over. If yes, ending the counting; otherwise using the next reference image and repeating steps B2-B12.

In the above embodiments, a high-definition video recording device (such as a smart phone, etc.) can be used at a fixed position from a certain angle and a suitable distance to record the entire jump rope process including the rope jumper. Using visual and auditory sensory mechanisms analysis to process the video and audio information separately, and performing judgement by the fusion of the obtained video and audio information to achieve automatic counting of jumps, which not only saves manual time, improves counting accuracy, but also able to retrack the jump rope by video.

Embodiment 2

As shown in FIG. 2, the embodiment 2 of the present disclosure provides a jump counting method for jump rope. The jump counting method comprises the following steps.

A1, obtaining a video data of a jump rope movement, and extracting an audio data and an image data from the original video data.

A2, extracting an audio sampling frequency from the audio data, drawing an audio waveform diagram with time as the abscissa, as shown in FIG. 3; determining a period $T_1$ of each jump according to the period of each sharp sound in the audio waveform diagram; in this embodiment, the average value of all periods is taken.

A3, performing a single-frame processing on the image data to obtain a set of sequentially arranged single-frame images.

A4, determining a reference area of the single-frame images, and grasping the reference area to obtain a reference image. The reference area is an area that appears in each jump. When the camera angle or rope jumper is changed, the reference area may change). When the camera is fixed and the position of the jump rope is determined, the reference area can be determined. There are many methods to determine the reference area. In this embodiment, the selection of reference area is as show in FIG. 4. Referring to FIG. 3, a rectangular portion with a length of 77 pixels and a width of 15 pixels, having a coordinate (379, 433) being defined as the upper left vertex, is selected as the reference area. The background color of the rectangular portion is relatively obvious than other portions in the picture, and the noise is small. In each period of the jump, the movement of rope will appear in the rectangular portion.

A5, performing a binary processing and an edge tracking on the reference image. separating a target, and determining whether the target is the jump rope.

The reference image after the binarization process is shown in FIG. 5. In this embodiment, the maximum inter-class variance method is adopted, which is an adaptive threshold determination method, also known as OTSU method. According to the gray characteristics of the image, the image is divided into two parts including the background and the target. The larger the inter-class variance between the backgrounds and the targets, the greater the difference between the two parts. When some of the targets are classified to be the background, or some of the background are classified to be the target, the difference between the two parts becomes smaller. Therefore, the segmentation that maximizes the variance between inter-class variance is the way to minimize the misclassification. After the binarization process, there is still a bit of noise. In the embodiment, objects with an area less than 8 pixels in the binary image will be eliminated for subsequent analysis and processing.

After edge tracking, each target in the image is separated. After separation, these separated targets are labeled respectively, and each separated target is filled with a different color using the HSV method to achieve a more obvious distinguishing effect.

The method to determine what is a jump rope is as follows.

The edge-tracked target is separated out for labeling and coloring by HSV method. Each target will be filled with different color. The three parameters including eccentricity, area, and extreme points of the eight-direction area for each target is obtained and compared with the expected interval. When the three parameters fall within the expected interval, the target is determined as a jump rope.

In this embodiment, the target is determined by judging whether the characteristics of the parabola is conformed to. The rope can be approximately projected to be a parabola during the periodic movement, and the eccentricity of the parabola is 1. Accordingly, if the eccentricity is approximately 1, then it can be determined to be conform to the characteristics of the parabola, and therefore the rope can be identified. In order to be more accurate, the area and the extreme point of the eight-direction area can be used for assisting to identifying the rope.

In this embodiment, the expected interval of the eccentricity is ranged from 0.91 to 1, the expected interval of the area is ranged from 1190 pixels to 1280 pixels, and the data matrix of the extreme point of the eight-direction area is as the following table:

TABLE II

| | stats.Extrema | |
|---|---|---|
| | 1 | 2 |
| 1 | 0.5000 | 0.5000 |
| 2 | 78.5000 | 0.5000 |
| 3 | 78.5000 | 0.5000 |
| 4 | 78.5000 | 16.5000 |
| 5 | 78.5000 | 16.5000 |
| 6 | 0.5000 | 16.5000 |
| 7 | 0.5000 | 16.5000 |
| 8 | 0.5000 | 0.5000 |

During counting the jumps, a jump will be determined as valid and add one to the counts only when the three parameters falls within the respective expected interval and the table as shown above.

A6, determining whether a time interval between adjacent reference images in which the target is determined as the jump rope is less than T1; if yes, keeping the calculation unchanged; otherwise add one to the calculation.

A7, determining whether the counting time is over.

In the above embodiment, a high-definition video recording device (e.g. a smart phone, etc.) can be used at a fixed position from a certain angle and a suitable distance to record the entire process including the rope jumper. The jump counting method analyzes the visual and auditory sensory mechanism of rope jumper during jump rope, and automatically and correctly counting jumps by the fusion of video and audio information during jump rope, which not only saves manual time, improves counting accuracy, but also able to retrack the jump rope by video.

Preferably, in step A2, the period $T_1$ of a jump is determined by each sharp sound appearing in the audio. Preferably, an average value of all periods is used.

Preferably, in step A4, a rectangular portion with a length of 77 pixels and a width of 15 pixels is selected as the reference area. The reference area is an area that appears in each jump.

The reference area is an area that appears in each jump. When the camera angle or rope jumper is changed, the reference area may change). When the camera is fixed and the position of the jump rope is determined, the reference area can be determined. There are many methods to determine the reference area. In this embodiment, the selection of reference area is as show in FIG. 4. Referring to FIG. 3, a rectangular portion with a length of 77 pixels and a width of 15 pixels, having a coordinate (379, 433) being defined as the upper left vertex, is selected as the reference area. The background color of the rectangular portion is relatively obvious than other portions in the picture, and the noise is small. In each period of the jump, the movement of rope will appear in the rectangular portion.

Preferably, in step A5, the maximum inter-class variance method is adopted, which is an adaptive threshold determination method, also known as OTSU method. According to the gray characteristics of the image, the image is divided into two parts including the background and the target. The larger the inter-class variance between the backgrounds and the targets, the greater the difference between the two parts. When some of the targets are classified to be the background, or some of the background are classified to be the target, the difference between the two parts becomes smaller.

Therefore, the segmentation that maximizes the variance between inter-class variance is the way to minimize the misclassification. After the binarization process, there is still a bit of noise. In the embodiment, objects with an area less than 8 pixels in the binary image will be eliminated for subsequent analysis and processing.

In some embodiments, the edge tracking method for the reference image in step A5 may comprises:

A51, using bwboundaries function to perform edge tracking on each target in the image, as shown in FIG. 4. Edge tracking aims to clearly separated out each target from the image.

A52, labeling the separated targets, and coloring the targets by HSV method. Different color may be used to fill in the different targets for distinguishing the targets clearly.

A53, performing region props function on each target which are labeled for analysis.

Furthermore, in step A5, the method of determining a jump comprises the following.

Separating out the targets which is performed with edge tracking and labeling the separated targets, coloring the targets by HSV method with different color filing in different targets; obtaining the three parameters including eccentricity, area, and extreme points of eight-directional area. When the three parameters fall within the expected interval, the target is determined as a jump.

In some embodiments, an expected interval of the eccentricity is ranged from 0.92 to 1. An expected interval of the area is ranged from 1190-1280 pixels. A data matrix of the extreme points of eight-directional area is confront to a specified table as shown above in Table 1 or Table 2.

When counting, a jump is considered valid only when the three intervals (or data matrix) are satisfied at the same time.

The target is determined by judging whether the characteristics of the parabola is conformed to. The rope can be approximately projected to be a parabola during the periodic movement, and the eccentricity of the parabola is 1. Accordingly, if the eccentricity is approximately 1, then it can be determined to be conform to the characteristics of the parabola, and therefore the rope can be identified. In order to be more accurate, the area and the extreme point of the eight-direction area can be used for assisting to identifying the rope.

It is to be noted that the preferable embodiments regarding steps A1-A7 in Embodiment 2 can be applied to the equivalent steps A1-A7 in Embodiment 1.

Embodiment 3

As shown in FIG. 6, the Embodiment 3 of the present disclosure provides a jump counting method for jump rope. The counting method may comprises the following steps.

B1, obtaining the original video data of the jump rope move via the camera, and starting timing.

B2, extracting image data from the original video data, performing single-frame processing on the image data to obtain a set of sequentially arranged single-frame images, and extract the count time.

B3, determining the face region of rope jumper in each frame of the image. First, skin color recognition is performed on each frame of the image, and the interference data is filtered to obtain a binary image, as shown in FIG. 7. Then non-face skin color regions are excluded. At last, the face regions are framed in the original RGB image for backup, as shown in FIG. 8.

B4, taking out the height coordinates of the center points of the face region.

B5, obtaining the curve of the height coordinates of the center points with time B6, using the zero-crossing counting method to get the number of jumps of the rope jumper. In this embodiment, a curve of the height coordinates of the center points with time is drawn, and the moving average filtering process is performed to obtain the curve as shown in FIG. 9, and then the number of jumps of the rope jumper is obtained by using a zero-crossing counting method. It should be noted that the number of jumper's jumps does not equal the number of jumps of the jump rope in special cases such as continuous jumps.

B7, extracting audio data from the video data, and extracting the audio sampling frequency, and drawing an audio waveform diagram with time as the horizontal axis. The resulting time domain waveforms is shown in FIG. 10.

B8, calculating the number of jumps using the cross-correlation method. First, taking the audio segment of a single contact between the jump rope and the ground as the sample audio x, whose time domain waveform is shown in FIG. 11, and taking the sequence of the audio frequency as the measured audio y. The cross-correlation value between the sample audio x and the measured audio y is calculated. Then drawing a diagram of "cross-correlation value", as shown in FIG. 12. A proper cross-correlation threshold is set (i.e. 0.1 in this embodiment), and the number n of times that exceeds the set threshold is counted. Namely, n is the number of jumps.

B9, combining video and audio to determine the number of jump ropes. When there is continuous jumps (i.e. twice or more swings of the rope with single jump).

B10, fusing video and audio information to determine whether the jump is valid.

First of all, invalid jumps shall be excluded. The average jump period $T_1$ is calculated first. When there is a jump with a period greater than $3T_1$, the jump is considered invalid, and will not be counted.

In another situation, finding out the audio jumps within a period of a valid video jumps. When one valid video jump is corresponding to one audio jump, or one valid video jump is corresponding to multiple audio jumps, then the jump is considered as valid and the number of the audio jumps is counted. When there is not audio jumps within the period of a valid video jump, then the jump is considered invalid and will not be counted.

B11, if the jumps is considered valid, then add one to the calculation (counting); if not, no counting.

B12, determining if the set time is over. If yes, ending the counting; otherwise using the next reference image and repeating steps B2-B12.

B13, outputting and displaying the counting result.

In the above embodiments, a high-definition video recording device (such as a smart phone, etc.) can be used at a fixed position from a certain angle and a suitable distance to record the entire jump rope process including the rope jumper. Using visual and auditory sensory mechanisms analysis to process the video and audio information separately, and performing judgement by the fusion of the obtained video and audio information to achieve automatic counting of jumps, which not only saves manual time, improves counting accuracy, but also able to retrack the jump rope by video.

In preferable embodiments, step B3 may further comprises the following steps.

B31, identifying skin color in each frame of the image, and filtering the interference data to obtain a binarization image.

For the detection of face shape and center position, locating the face position in the image and obtaining a minimum circumscribed rectangle of the face and then a substantial face region can be framed. Accordingly, a Gaussian skin color probability model may be used. The skin color detection generally uses the YCbCr color space. The formula for converting RBG to YCbCr is:

$(Y=0.257{\times}R+0.564{\times}G+0.098{\times}B+16)$ $(Cb=-0.148{\times}R-0.291{\times}G+0.439{\times}B+128)$ $(Cr=0.439{\times}R-0.368{\times}G-0.071{\times}B+128)$ The skin color satisfies the Gaussian distribution in the chromaticity space, namely, (Cb, Cr) space. According to the two-dimensional Gaussian function, the formula for calculating the skin color probability density of each pixel is as follows:

$$p(CbCr)=\exp[-0.5(x-m)^T C^{-1}(x-m)]$$

wherein, $x=(CbCr)^T$; $m=E(x)$, i.e. average value; $C=E\{(x-m)(x-m)^T\}$, i.e. covariance matrix.

The similarity between each pixel in the image and the skin color is calculated according to the above formula. The similarity between each pixel and the skin color is matched up with the grayscale of each pixel, and the color image is converted into the gray image, that is, the skin color likelihood map. On this basis, the grayscale image is converted into a binary image.

B32, excluding the non-face skin regions.

The binary image also includes non-face skin regions such as arms, hands, legs, and feet. It is necessary to distinguished them from the face skin region. Starting from the geometric features of the face, this embodiment uses three conditions, including limited number of pixels (that is, limiting the size of the area occupied), limited aspect ratio, and limited rectangle (that is, the degree of similarity to the rectangle), to extract the face region from the non-face skin regions. The details are as follows:

Due to the occlusion of the rope jumper's clothes, different skin color regions are not connected. So each skin color region can be traversed to obtain information such as the number of pixels, maximum length and maximum width, and rectangularity of each skin color region. These three conditions are used to determine whether the skin regions belongs to face regions or not. For a non-face skin region, all pixels in the region are assigned a value of 0, i.e. turning black and make it become the background.

B33, framing the face region in the original RGB image.

After obtaining the face region, determining the size and position of the smallest circumscribed rectangle of the face according to the maximum and minimum coordinate information of the length and width of the region; and then drawing the smallest circumscribed rectangle at the same position of the original RGB image. By so, the face region can be framed, and the determination of the face region is completed.

In some preferable embodiments, in step B3, the step of extracting the height coordinates of the center point of the face region is described as follows:

Taking the coordinates of the geometric center according to the coordinates of the four vertices of the face region obtained in step B33 as the coordinates of the center point. In the process of in-situ jump rope, the area where the jumper moves horizontally is generally not very large, so the change in the coordinate height can be approximated by the change in the center of gravity of the jumper. An analysis on the height of the center point of the jumper can be a way to count the jumps of jump rope.

In some preferable embodiments, the step B4 further comprises the following steps.

After learning the height coordinates of the center point of the face region from step B3, a curve of the height coordinates of the center point with time can be obtained. The curve has some jitters and burrs, etc., and requires moving average filtering. Moving average filtering is a method of noise reduction for signal filtering based on statistic, whose principle is as follows: treating the continuous data to be processed as a window with N data; each time a new data is processed, the N data within the window N is shifted forward by 1 bit wholly. Namely, the first data in the window will be removed, and the new data becomes the last data in the window. Then the N data in the window is averaged, and the obtained average value is taken as the value of the processed data. The calculation formula is as follows:

$$y(n) = \frac{x(n) + x(n-1) + x(n-2) + \ldots + x(n-N+1)}{N}$$

wherein, n represents the number of frame; x(n) represents the actual height of the center point; N represents the window length of the moving average filtering; y(n) represents the height of the center point of nth frame after moving average filtering. The moving average filtering can well filter out the jitter and burr in the motion trajectory curve, and make the curve more continuous and smoother. The selection of the window length N value should be combined with the specific counting method. In these embodiments, N=5.

B42, the step of using cross-zero calculation method to obtain the number of jump of the jump rope may further comprises:

finding out the maximum value $y_{max}$ of y coordinate and the minimum value $y_{min}$ of y coordinate; averaging the maximum value $y_{max}$ and the minimum value $y_{min}$ to obtain the average value $y_{mid}$;

redrawing a track curve after filtering with the line $y=y_{mid}$ being the x axis of the new coordinate system;

finding out the intersection points of the track curve and the x axis of the new coordinate system; the number of jump is half the number of the intersection points.

In preferable embodiments, in step B5. the audio information extracted from the jump rope video is used as the to-be-measured audio, and a time domain waveform diagram is obtained based on the to-be-measured audio.

In step B5, the step of using the cross-correlation method to count the number of jumps may comprises the following steps.

Taking the audio segment of a single contact between the jump rope and the ground as the sample audio x, whose time domain waveform is shown in FIG. 11, and taking the sequence of the audio frequency as the measured audio y; calculating the cross-correlation value between the sample audio x and the measured audio y. The cross-correlation function is calculated by the follows:

$$\hat{R}_{xy}(m) = \begin{cases} \sum_{n=0}^{N-m-1} x_{n+m} y_n^*, & m \geq 0, \\ \hat{R}_{xy}^*(-m), & m < 0 \end{cases}$$

wherein, N is the length of the longer signal sequence of x and y; the label "*" means complex conjugate; m represents the number of shifted sampling points; $\hat{R}_{yx}(m)$ represents the sequence y stays unchanged. After shifting the sequence x to the left by m sampling points, the two sequences are multiplied correspondingly point by point. The cross-correlation function is used to characterize the degree of correlation between the values of two signals x, y at any two different times. It is an important criterion for determining whether two signals x, y are related in the frequency domain. The number of cross-correlation is obtained by normalizing the result of cross-correlation operation of two signals x and y. The greater the number of correlations, the higher the correlation between the two signals.

Drawing a diagram of "cross-correlation value", as shown in FIG. 12. A proper cross-correlation threshold is set (i.e. 0.1 in this embodiment), and the number m of times that exceeds the set threshold is counted. Namely, m is the number of jumps.

Setting a minimum jump interval between every two jumps. According to the search, there are 300 records of a single person's 1-minute jump rope. Namely, each jump cycle is greater than 0.2 s, and the audio sampling frequency is Fs=44100, that is, there should be at least 0.2*44100=8820 data between the two jump counts.

In a preferable embodiment, the step B6 further comprises the following steps.

B61, invalid jumps are excluded. The average jump period $T_1$ is calculated first. When there is a jump with a period greater than $3T_1$, the jump is considered invalid, and will not be counted.

B62, finding out the audio jumps within a period of a valid video jumps. When one valid video jump is corresponding to one audio jump, or one valid video jump is corresponding to multiple audio jumps, then the jump is considered as valid and the number of the audio jumps is counted. When there is not audio jumps within the period of a valid video jump, then the jump is considered invalid and will not be counted.

Since there is continuous jumps (i.e. twice or more swings of the rope with single jump), the combining video and audio to determine the number of jump ropes has more advantages than using either video information or audio information separately.

To be noted, the steps B1-B13 along with the described preferable embodiments in Embodiment 3 can be applied to the steps B1-B13 in Embodiment 1.

What is claimed is:

1. A counting method for jump rope, comprising:
S1, obtaining an original video data of a jump rope movement, and extracting an audio data and an image data from the original video data;
S2, calculating the number of jumps of a rope jumper according to an audio information and an image information extracted from the audio data and the image data; and
S3, outputting and displaying the calculation result;
wherein the step S2 comprises
A2, extracting an audio sampling frequency from the audio data, drawing an audio waveform diagram with time as an abscissa, and determining a period $T_1$ of each jump according to the audio waveform diagram;
A3, performing a single-frame processing on the image data to obtain a set of sequentially arranged single-frame images;

A4, determining a reference area of the single-frame frame images, and grasping the reference area to obtain a reference image;

A5, performing a binary processing and an edge tracking on the reference image, separating a target, and determining whether the target is the jump rope;

A6, determining whether a time interval between adjacent reference images in which the target is determined as the jump rope is less the period $T_1$; if yes, keeping the calculation unchanged; otherwise add one to the calculation.

2. The method of claim 1, wherein in the step A2, the period $T_1$ is determined by a sharp sound appearing in the audio information.

3. The method of claim 1, wherein in the step A4, a rectangular portion with a length of 77 pixels and a width of 15 pixels is selected as the reference area.

4. The method of claim 1, wherein in the step A5, a maximum inter-class variance method is adopted; after binary processing, objects with areas smaller than 8 pixels is eliminated from the binary image for filtering interference data.

5. The method of claim 1, wherein in the step A5, performing the edge tracking on the reference image comprises:
using bwboundaries function to perform the edge tracking on each target in the image,
labeling the separated targets, and coloring the targets by HSV method; wherein different colors is filled in the different targets for distinguishing the targets,
performing region props function on each target which are labeled.

6. The method of claim 1, wherein the step A5, the edge-tracked target is separated out for labeling and coloring by HSV method; wherein each target is filled with different colors; the three parameters including eccentricity, area, and extreme points of the eight-direction area for each target is obtained and compared with corresponding expected intervals; when the three parameters fall within the respective expected intervals, the target is determined as a jump rope.

7. The method of claim 1, wherein the step S2 comprises:
performing a single-frame processing on the image data to obtain a set of sequentially arranged single-frame images;
determining a face region of the jumper in each frame of the images, and extracting height coordinates of center points of the face region;
obtaining a curve of the height coordinates of the center points over time, and using a zero-crossing counting method to obtain the number of jumps of the jumper;
extracting the audio sampling frequency, drawing an audio waveform diagram with time as the abscissa, and using a cross-correlation counting method to calculate the number of jumps; and
fusing the video information and the audio information to determine whether the counted number of jumps is valid; if yes, adding one to the calculation; otherwise, keep the calculation unchanged.

8. The method of claim 7, wherein the step of determining a face region of the jumper comprises:
performing skin color recognition on each frame of the images, and filtering interference data to obtain a binary image; and
excluding non-face skin color regions;
framing the face regions in the original RGB image.

9. The method of claim 7, wherein the step of drawing an audio waveform diagram with time as the abscissa, and using a cross-correlation counting method to calculate the number of jumps comprises:
drawing a curve of the height coordinates of the center point with time; and performing a moving average filtering on the curve; wherein, the continuous data to be processed as a window with N data; each time a new data is processed, the N data within the window is shifted forward by 1 bit wholly; a first data in the window is removed, and the new data becomes the last data in the window; the N data in the window is averaged, and the obtained average value is taken as the value of the processed data; the calculation formula thereof is as follows:

$$y(n) = \frac{x(n) + x(n-1) + x(n-2) + \ldots + x(n-N+1)}{N}$$

wherein, n represents the number of frames; x(n) represents the actual height of the center points; N represents the window length of the moving average filtering; y(n) represents the height of the center point of nth frame after moving average filtering;
finding out a maximum value $y_{max}$ in y axis of the curve and a minimum value $y_{min}$ in y axis of the curve; averaging the maximum value $y_{max}$ and the minimum value $y_{min}$ to obtain an average value $y_{mid}$;
redrawing a filtered track curve with a line of $y=y_{mid}$ being x axis;
finding out intersection points of the track curve and the x axis; wherein the number of jumps is half the number of the intersection points.

10. The method of claim 7, wherein the cross-correlation counting method comprises:
taking an audio segment of a single contact between the jump rope and ground as the sample audio x, and taking a sequence of the audio frequency as the measured audio y; calculating the cross-correlation value between the sample audio x and the measured audio y;
drawing a cross-correlation value diagram; setting a proper cross-correlation threshold, and counting the number m of times that exceeds the set threshold, wherein m is the number of jumps.

11. The method of claim 10, wherein the cross-correlation threshold is set to be 0.1.

12. The method of claim 7, wherein the step of fusing the video information and the audio information to determine whether the counted number of jumps is valid comprises:
removing invalid jumps by calculating an average jump period $T_1$ of each jump; when there is a jump with a period greater than $3T_1$, the jump is determined invalid and removed from counting;
removing invalid jumps by counting the number of audio jumps in the period of one valid video jump; when there is one or more audio jumps in the period, the audio jump(s) is/are considered as valid and the number of the audio jumps is counted to the number of jumps; wherein the audio jump is a jump identified from the audio information; the valid video jump is a jump identified valid in the video information.

13. The method of claim 6, wherein an expected interval of the eccentricity is ranged from 0.91 to 1, an expected interval of the area is ranged from 1190 pixels to 1280 pixels, and a data matrix of the extreme point of the eight-direction area is as the following table:

|   | 1       | 2        |
|---|---------|----------|
| 1 | 0.5000  | 0.5000   |
| 2 | 78.5000 | 0.5000   |
| 3 | 78.5000 | 0.5000   |
| 4 | 78.5000 | 16.5000  |
| 5 | 78.5000 | 16.5000  |
| 6 | 0.5000  | 16.5000  |
| 7 | 0.5000  | 16.5000  |
| 8 | 0.5000  | 0.5000.  |

* * * * *